United States Patent [19]

Miller

[11] 4,120,507
[45] Oct. 17, 1978

[54] COMPENSATED EXTENDABLE STEERING MEANS FOR HEAVY MACHINES

[75] Inventor: Charles P. Miller, McHenry, Ill.

[73] Assignee: Miller Formless Co. Inc., McHenry, Ill.

[21] Appl. No.: 778,122

[22] Filed: Mar. 16, 1977

[51] Int. Cl.² .............................................. B62D 11/22
[52] U.S. Cl. ..................................... 280/6 R; 60/581; 91/520; 180/9.46; 180/41; 180/132; 280/772; 280/95 R
[58] Field of Search .............. 180/41, 9.52, 9.5, 9.46, 180/132; 280/6 R, 6.11, 6.1, 772, 95 R; 91/170 R, 411 B; 60/546, 581

[56] References Cited

U.S. PATENT DOCUMENTS

| 450,981 | 4/1891 | Stevenson | 60/546 |
| 3,579,989 | 5/1971 | Stark | 60/546 X |
| 3,710,695 | 1/1973 | Miller | 404/105 X |

*Primary Examiner*—John P. Silverstrim
*Attorney, Agent, or Firm*—Bruce K. Thomas

[57] ABSTRACT

Compensating cylinders are provided for pairs of transverse steering linkages connecting pairs of tractors that steer in unison on opposite sides of a main frame of a heavy construction machine whereby the steering linkages automatically extend and retract to accommodate the changes in length imposed by changes in the slope or off-sets in the grade being negotiated by the machine.

3 Claims, 3 Drawing Figures

U.S. Patent    Oct. 17, 1978    4,120,507
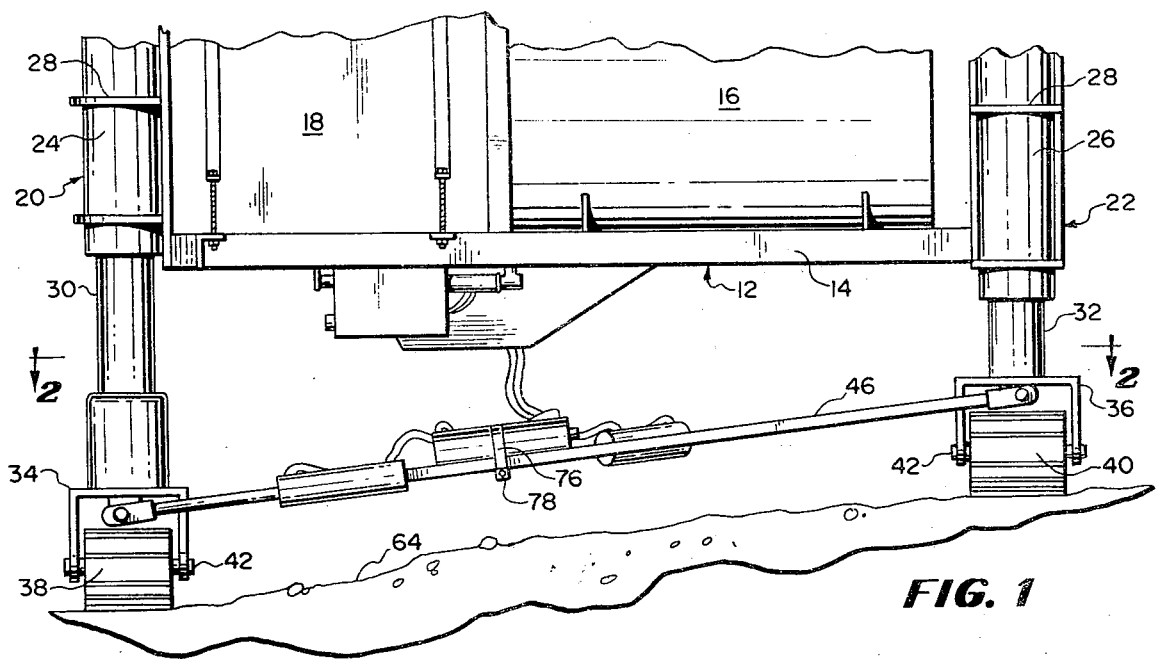
FIG. 1
FIG. 2
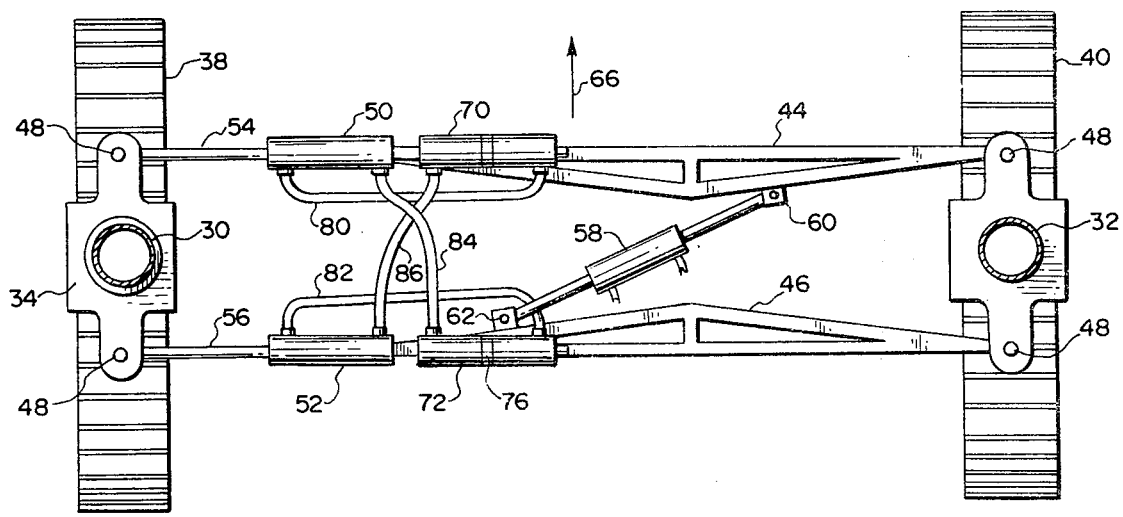
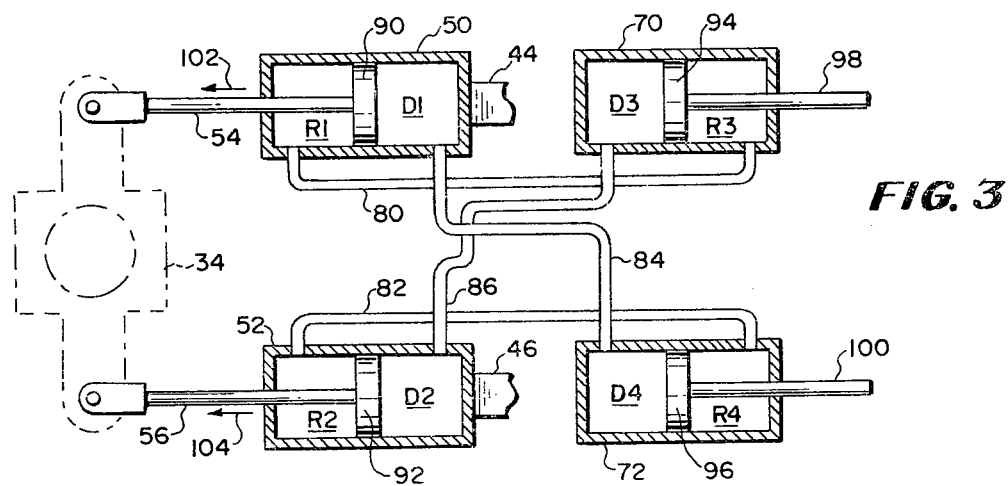
FIG. 3

COMPENSATED EXTENDABLE STEERING MEANS FOR HEAVY MACHINES

BACKGROUND OF THE INVENTION

U.S. Pat. No. 3,710,695 by Messrs. Charles P. Miller, Allen R. Miller and David J. Miller discloses a curb and gutter machine wherein the main frame is supported upon two pairs of crawler tractors, each pair being steerable in unison on vertical steering axes. The front and rear tractors on one side (outboard) of the main frame have individually controlled vertically adjustable support means which control the grade of machine and the slip form tool as it progresses along the path of travel. The front and rear tractors on the other side (inboard) of the main frame are connected to the ends of a walking beam that extends horizontally along that side of the main frame. A single vertically adjustable support means is affixed centrally of this other side of the main frame and is pivotally connected on a transverse axis to the center of the walking beam for slope control.

The machine described in this patent is quite versatile in that not only does it provide finite and automatic control of the grade and slope of the finished product, it can be easily maneuvered into position along a grade line and the steering capabilities allow the machine to follow the grade line exactly as it progresses along the path of travel. This is because both the front and rear pairs of tractors steer in unison and independently so that the machine can make sharp turns as well as maintain itself and the frame tangential to outside curves and in a chordal relationship to inside curves.

Since the machine has a large degree of vertical adjustment capability at each vertical support, the dual steering linkage for each pair of tractors must extend and retract in unison as the machine negotiates transverse offsets in the grade as shown in FIG. 3 of the patent. To accomplish this, referring to FIG. 4 of the patent, the front pair of linkages 168 and 170 is provided with the compensating cylinders 190 and 192 which are cross-connected by means of the hydraulic lines 198 and 200 so that the exhaust of one becomes the intake of the other. The rear pair of steering linkages 172 and 174 has the compensating cylinders 208 and 210 that are cross-connected in the same manner by the hydraulic lines 212 and 214.

Thus, the respective pairs of rods 194 and 196 and the rods 215 of these four compensating cylinders are allowed or forced to extend and retract in unison to lengthen the steering arms or linkages to accommodate the greater or lesser distances from the other tractors to which these linkages are affixed.

This steering system works well and is quite durable. However, it is to be observed that each of these compensating cylinders is so connected that the side of one cylinder which includes the piston rod (for present purposes called the replacement chamber) is connected to the side of the other cylinder which does not have a rod therein (the displacement chamber). One would assume that since the actual volumetric displacement on each side of the piston in each ram or cylinder is different by the amount of hydraulic oil displaced by the rods, the displacement ahead or behind each piston as it moves would be less than or greater than the volume of the other portion of the dual system to which it is connected and the rams would lock up. It actual practice, however, the system contains sufficient air, about 5% by volume, which is compressible, to off-set this difference. However, the result is that the full extension and retraction potential of each compensating ram is not obtained and unnecessary limitations are placed on this function of the machine.

It is a feature of the machine of said patent to provide extreme versatility as far as operability is concerned over rough grade and only that portion of the grade upon which the curb and gutter is to be laid need be graded with any exactitude. This greatly reduces the costs of construction and allows the machine to be used under conditions that are not possible with other construction machines that are designed to lay curb and gutter or other such extruded concrete structures. Regardless of this extreme versatility the machine is often used under such adverse grade conditions by zealous or incompentent operators that its grade compensating functions are exceeded and mechanical failures may result. This invention is intended to overcome this limitation in the steering and leveling functions of machines having at least a pair of tractors which must steer and simultaneously control grade under extreme conditions so often imposed by operators of such machinery in the construction field.

SUMMARY OF THE INVENTION

In accordance with this invention, the compensating rams that allow the steering linkages to extend and retract in unison are cross-connected to a pair of floating rams, carried on the linkages, so that the displacement chambers ahead of each piston in the compensating rams are each connected by a hydraulic line to the displacement chambers of a pair of floating pistons and the replacement chambers of the compensating rams, those which include the piston rods, are each connected with a hydraulic line to the replacement chambers of the floating pistons, also including the piston rods. Thus, the displacement chambers of equal volume and the replacement chambers of equal volume are connected and the system is not dependent on the pressure of any air in the hydraulic oil. By this means each compensating cylinder can extend and retract fully to and from each end of its respective cylinder and the full stroke potential is attained as well as more positive extension and retraction. At the same time the steering function and longitudinal stiffness of the linkages is maintained if not increased so that one linkage can be forced in one transverse direction and the other linkage in the opposite direction to cause the ground engagement means to each rotate more exactly in the same direction or in reverse direction like the front wheels of an automobile, for right and left hand steering.

DESCRIPTION OF THE DRAWINGS

An illustrative embodiment of the invention is shown in the drawings wherein:

FIG. 1 is a fragmentary end view of a slip-form paving machine or similar heavy duty prime mover showing the tractors negotiating a slope in the grade requiring the simultaneous lengthening of the dual steering linkage between the opposite tractors;

FIG. 2 is a simplified plan view of the system of FIG. 1 taken along the lines 2—2 thereof; and FIG. 3 is a simplified diagramic illustration of the hydraulic system with the rams and floating cylinders shown in cross-section to explain the flow of hydraulic fluid therein during operation.

THE PREFERRED EMBODIMENT

Referring to FIG. 1 the slip-form paver 10 is shown to include the frame 12 with the end cross beam 14 and other frame parts supporting the water tank 16 and fuel tank 18 and having the pair of adjustable support means 20 and 22 at opposite outside corners. These support means include the respective fixed vertical guide cylinders 24 and 26 that are rigidly attached by gusset plates 28 to the frame 12 and held by auxillary bracing of heavy structural sheet metal as an integral part of the frame.

The guide cylinders 24 and 26 each form a housing for an extensible member (not shown) such as a hydraulic ram, which are affixed at their top ends to a clevis pin (not shown) to allow a small degree of play during extension and retraction, and affixed at their bottom ends to the sleeves 30 and 32. The sleeves 30 and 32 are slideably mounted in the guide cylinders 24 and 26 so that extension and retraction of the extensible members allows straight vertical reciprocation of the supports 20 and 22 in a manner now well known in this art. The arrangement also provides a vertical pivot or steering axis also well known. Further description is therefore unnecessary and these parts are only indirectly related to the invention and then only so far as such adjustment ability and pivoting is for the purpose of maintaining the frame and working tool at a predetermined elevation and cross slope and providing a steering function.

The adjustable supports 20 and 22 provide the vertical pivot steering function during all positions of extension and retraction and the details thereof are also omitted for simplicity. These functions are described in said reference U.S. Pat. 3,710,695 and others belonging to the instant assignee.

Each sleeve 30 and 32 is affixed to the top plate of its respective saddle mounts 34 and 36 which straddle the center of the endless tracks 38 and 40 and are pivotally mounted thereto by means of the transverse pins 42. The drive motors that individually propel the tractors are not illustrated.

Referring to FIGS. 1 and 2 a pair of steering linkages 44 and 46 is provided that extend transverse the frame, the former being pivotally connected to the saddle mount 36 at pivot pin 48 and the latter attached to the same saddle mount, but on the opposite side of the steering axis, here indicated by the sleeve 32, by means of the second pin 48.

The steering linkages 44 and 46 are rigid structural members that extend in generally parallel relationship across the machine under the frame and each includes a respective compensating cylinder 50 and 52, the rods 54 and 56 of which are similarly attached to the opposite or fore and aft sides of the steering axis 30 to the saddle mount 34 by means of a second pair of pins 48.

In order to turn the tractors 38 and 40 in unison and in the same direction about their steering axes 30 and 32, the steering ram 58 is connected obliquely between the steering linkages 44 and 46 by means of the pivot mounts 60 and 62. It is apparent that the extension or retraction of the steering ram 58, through hydraulic control from the machine (the details thereof are omitted) one linkage will be moved in one direction and the other in the opposite direction, so that the tractors turn on their steering axes, like the front wheels of an automobile.

During the steering of the tractors 38 and 40 the compensating rams 50 and 52 are rigid and hydraulically locked so that their rods 54 and 56 do not move in relation to the ram housings and the linkages 44 and 46 remain at the same length. In the event one side of the machine must negotiate a slope in the grade 64 as shown in FIG. 1, it is necessary for the rams 50 and 52 to extend and lengthen the linkage automatically, since the transverse distance between the tractors is now increased. This condition is shown by the tractor 38 being lower than the tractor 40 while the frame 12 is maintained level to a predetermined reference such as a grade line.

When the grade 64 again levels off as the machine progresses along its path of travel as may be indicated by the arrow 66, the support means 20 must retract and the rods 54 and 56 simultaneously shorten or retract to compensate for the now shorter transverse distance between the tractors.

In order to provide for the uniform and simultaneous retraction and extension of the compensating cylinders 50 and 52, while still maintaining the stiffness of the linkages 44 and 46 during any steering functions that may also occur, the compensating rams are connected into the system, as shown in FIGS. 2 and 3, with the pair of floating cylinders 70 and 72, same being attached to and carried by their respective steering linkages or arms 44 and 46 by means of the steel bands 74 and 76, or similar means, the means of attachment therefor being represented by bolt 78 in FIG. 1.

In addition, a particular closed hydraulic system to include the flexible hydraulic hoses or lines 80 and 82 and cross-connected flexible hydraulic lines 84 and 86 are provided in accordance with this invention as shown in FIG. 2, the details of which are better shown in FIG. 3.

In order to more readily describe the hydraulic flow that takes place during the extension and retraction of the compensating rams 50 and 52, reference is made to FIG. 3 wherein the pistons and rods as well as the respective chambers are exposed by cross-sectioning. Thus, the cylinder or ram 50 has its piston 90 connected to the rod 54, and the ram 52 has its piston 92 connected to the rod 56. However, the floating rams 70 and 72 have free-moving pistons 94 and 96 and their respective piston rods 98 and 100 are unrestricted.

The displacement chamber of ram 50 is designated $D_1$ and the same chamber of ram 52 is designated $D_2$. The displacement chambers of rams 70 and 72 are designated $D_3$ and $D_4$. These four chambers are cross-connected by means of the flexible hydraulic lines 84 and 86. The replacement chambers of the rams 50 and 52 are labelled $R_1$ and $R_2$ respectively and the rods 54 and 56 therein also occupy a portion of these chambers. Similarly the replacement chambers of the rams 70 and 72 are designated $R_3$ and $R_4$ and contain the rods 98 and 100.

It is readily apparent that when the machine moves from a level grade to a cross slope as shown in FIG. 1, the linkages 44 and 46 can lengthen simultaneously in the direction of the arrows 102-104 and cause the free flow of hydraulic fluid through the system. Thus the replacement chambers $R_1$ and $R_2$ discharge through lines 80 and 82 to the replacement chambers $R_3$ and $R_4$, and the displacement chambers $D_1$ and $D_2$ discharge via lines 84 and 86 into the displacement chambers $D_3$ and $D_4$. Since the volumetric displacements of each of the pairs of connected chambers are equal the system is balanced and locked in parallel relationship.

The rods 54 and 56 extend and retract on equal linear distance in order to maintain the rigid and parallel relationship of the linkages 44 and 46. By using compensating and floating rams of identical construction and size, this result is readily attained. Since the rods 98 and 100 are free-moving it is not necessary that the physical dimensions of the floating rams 70 and 72 be identical to the compensating rams or to each other to attain this result as long as the volumetric changes in their respective interconnected chambers are equal to those of the compensating rams. The compensating rams, however, must be identical in all respects to achieve equal linear movement of their respective rods within the limits of any play in the pivots 48, 60 and 62. The rams 54 and 56 can be reversed and have their housings connected at the pivot points 48 if desired or be located at opposite ends of the linkages 44 and 46 to avoid obstructions over which the machine may pass.

The conduits or hoses 80 and 82 need not be flexible if the floating cylinders are carried by the linkages, but the steering function requires that the conduits 84 and 86 be flexible connections in the practical applications of the system. A construction machine having a pair of tractors connected as illustrated in the drawing will include at least one other point of support to form a stable vehicle which support could be a towing vehicle or a single ground engagement means fore or aft to form a three-point suspension, or as shown in said patent of reference herein can be another pair of supporting tractors.

When the machine encounters a level grade, the linkages 44 and 46 can retract simultaneously in a direction opposite the arrows 102-104 and the flow of hydraulic fluid between chambers will be reversed. In all positions of extension and retraction the linkages resist lengthening or shortening in opposite directions from each other because the discharge from either ram 50 or 52 is blocked by the floating cylinders and the required stiffness of the linkages is retained.

What is claimed is:

1. A mobile construction machine including:
   a main frame;
   a pair of vertically adjustable support means affixed to opposite sides of said main frame;
   ground engagement means disposed from said adjustable support means;
   each of said ground engagement means being connected to said support means through a vertical steering axis;
   a pair of transverse steering linkages connecting between said ground engagement means fore and aft of said vertical pivot axes;
   means to actuate said steering linkages and turn said ground engagement means in unison;
   each of said steering linkages having a compensating cylinder adapted to provide for the simultaneous extension and retraction of said steering linkages with changes in elevation of the grade supporting said machine;
   a floating cylinder associated with each of said compensating cylinders and carried by said machine;
   said compensating cylinders and said floating cylinders each having a displacement chamber on one side of the piston therein and a replacement chamber through which its piston rod extends on the other side of its respective piston;
   conduit means cross-connecting the respective displacement chambers of said compensating cylinders with the displacement chambers of said floating cylinders; and
   conduit means connecting the replacement chamber of each of said compensating cylinders with the replacement chamber of its associated said floating cylinder.

2. A mobile construction machine in accordance with claim 1 in which:
   the displacement and replacement chambers of the compensating cylinders allow substantially equal linear extension and retraction of their respective operating rods.

3. A steering assembly for a pair of pivotally mounted and vertically adjustable ground engagements supporting a mobile vehicle for transportation along a path of travel of variable cross-slope comprising:
   a pair of transverse steering linkages for connection to said ground engagement means fore and aft of the steering axes;
   each of said steering linkages having a compensating cylinder adapted to provide for the simultaneous extension and retraction thereof with changes in the transverse oblique distance between said ground engagement means as a cross-slope change is negotiated;
   a floating cylinder associated with each of said compensating cylinders;
   said compensating cylinders and said floating cylinders each having a displacement chamber on one side of the piston therein and a replacement chamber through which its piston rod extends on the other side of its respective piston;
   conduit means cross-connecting the respective displacement chambers of said compensating cylinders with the displacements chambers of said floating cylinders; and
   conduit means connecting the replacement chambers of each of said compensating cylinders with the replacement chambers of its associated floating cylinder.

* * * * *